(12) United States Patent
Sweeney et al.

(10) Patent No.: US 10,649,444 B2
(45) Date of Patent: May 12, 2020

(54) METHOD AND SYSTEM FOR GENERATING MINIMAL CUT-SETS FOR HIGHLY INTEGRATED LARGE SYSTEMS

(71) Applicant: THE BOEING COMPANY, Chicago, IL (US)

(72) Inventors: Stephen Sweeney, Madrid (ES); Lars Fucke, Madrid (ES)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 15/360,392

(22) Filed: Nov. 23, 2016

(65) Prior Publication Data

US 2017/0146983 A1  May 25, 2017

(30) Foreign Application Priority Data

Nov. 24, 2015 (EP) .................................... 15382581

(51) Int. Cl.
*G05B 19/418* (2006.01)
*G05B 23/02* (2006.01)
*G06Q 10/00* (2012.01)

(52) U.S. Cl.
CPC ..... *G05B 19/4188* (2013.01); *G05B 23/0248* (2013.01); *G05B 23/0251* (2013.01); *G06Q 10/20* (2013.01); *G05B 2219/39159* (2013.01)

(58) Field of Classification Search
CPC ............ G05B 19/4188; G05B 23/0248; G05B 23/0251; G05B 23/0283; G05B 23/0213;
(Continued)

(56) References Cited

U.S. PATENT DOCUMENTS

| 8,665,731 B1* | 3/2014 | Ramesh | H04L 41/5009 |
| | | | 370/242 |
| 2008/0177515 A1* | 7/2008 | Saintis | G05B 23/0283 |
| | | | 703/2 |
| 2015/0274312 A1* | 10/2015 | Conrad | B64D 45/00 |
| | | | 701/31.9 |

FOREIGN PATENT DOCUMENTS

EP  2827209 A2  1/2015

OTHER PUBLICATIONS

Kromodimoeljo et al., "Automatic Generation of Minimal Cut Sets", School of IT&EE, The University of Queensland, St. Lucia Qld 4072, Australia.
(Continued)

*Primary Examiner* — Mouloucoulaye Inoussa
(74) *Attorney, Agent, or Firm* — Womble Bond Dickinson (US) LLP

(57) ABSTRACT

A system and method are provided for generating minimal cut-sets for highly integrated large systems. The method includes receiving a system model (102) and a scenario (104), and obtaining a dependency array (300) from the system model (102) according to the scenario, with the dependency array (300) including at least one case (302). The method includes selecting a case (302) in the dependency array (300). The method includes querying a cut-set repository (110) to determine if a cut-set for a component (200) in the case (302) is already stored, and retrieving said cut-set; and if a cut-set is not stored, generating the minimal cut-set for the component (200). And the method includes computing a final cut-set list (112) by expanding the dependency array (300) using the cut-set for the component (200). The method improves the efficiency of cut-set generation applied to manufactured systems with great number of components.

15 Claims, 11 Drawing Sheets

(58) Field of Classification Search
CPC ......... G05B 2219/39159; G06Q 10/20; G06N
5/045; H02J 1/14; H02J 3/02; H02J
13/0062; H02J 13/0075; H02J 13/0096;
H02J 3/14; B64D 2221/00
USPC ................. 370/248, 242, 252; 714/2; 701/3;
700/79
See application file for complete search history.

(56) References Cited

OTHER PUBLICATIONS

Clemens, "Fault Tree Analysis", System Safety and Risk Management Lectures, XP055271979, 1999.
Zeng et al., "Risk Assessment for Enterprise Resource Planning (ERP) System Implementations: A Fault Tree Analysis Approach", Enterprise Information Systems, vol. 7, No. 3, pp. 332-353, 2013.
Xiang et al., "Automatic Synthesis of Static Fault Trees from System Models", 2011 Fifth International Conference on Secure Software Integration and Reliability Improvement, XP32037239A.
European Search Report for Application No. 15382581.5 dated May 23, 2016.
Examination Report for Application No. 15382561.5 dated Jun. 10, 2016.

\* cited by examiner

METHOD AND SYSTEM FOR GENERATING MINIMAL CUT-SETS FOR HIGHLY INTEGRATED LARGE SYSTEMS

CROSS-REFERENCE TO RELATED APPLICATION(S)

The present application claims priority to European Patent Application No. EP15382581.5, entitled: Method and System for Generating Minimal Cut-Sets for Highly Integrated Large Systems, filed Nov. 24, 2015, the content of which is incorporated by reference in its entirety.

TECHNOLOGICAL FIELD

The present disclosure is comprised in the field of reliability assessment in systems comprising a large number of components, such as a part or function of an airplane. More specifically, the disclosure relates to methods for generation of minimal cut-sets in highly integrated large systems.

BACKGROUND

A cut-set is a collection of possible functional sub-component failures or degradations that could lead to a possible failure event or degradation of a higher-level component or function. Cut-set analysis can be applied to any system such as automobiles or airplanes to identify and rank system dependencies during the design phase. In particular the method is suited to analyze large, highly integrated systems, such as in automobiles, aircraft or networked systems such as data or command and control networks.

The process of cut-set generation is vital to determine reliability of critical components. However, the cut-set generation process can be time consuming when applied to large systems made of a great number of components.

Most of the existing solutions for system reliability assessment make use of Fault Tree Analysis (FTA), a method which is time consuming.

Other solutions use an algorithm for cut-set generation, wherein all traces leading to the condition in question are calculated for each sub-condition analyzed. This method is still time consuming for large systems.

When using model-based methods for reliability assessment as part of large, highly integrated system architecture development, such as an airplane, a large number of conditions need to be assessed. Moreover, each condition can have a large number of potential causes (e.g., cut-sets), containing single or typically multiple component reliability issues. Producing an exhaustive list of cut-sets for large systems can be time consuming but is important in order to harvest the benefits of model-based methods. The present disclosure improves the efficiency of model-based cut-set generation.

BRIEF SUMMARY

The present disclosure relates to a system and method for generating cut-sets in highly integrated large systems, assuring high efficiency and accuracy. The cut-set generation process is based on a system model. For generating the large sets of cut-sets, the method re-uses data, identifies components serving as common resources for a large number of components within the system, and clusters or sets of components which are re-occurring in several related modes.

The system for generating cut-sets receives a system model, defined at a component and/or a functional level, and generates a model for all components that cascade to other components. Cut-sets for components with one or more dependent components are stored to eliminate the need to re-compute. The system also receives a possible component, function failure or degradation condition as input, to determine the upstream scenarios (cut-sets) that will cause the condition based on the dependencies described in the system model. This results in a dependency matrix for the component analyzed based on upstream components. This component level matrix is then stored for re-use in later component or function analysis.

The system and method for generating cut-sets allow for efficient and fast computation of minimal cut-sets in highly integrated, large systems. This feature is required when using model-based methods for system reliability assessment and design assurance activities. The invention makes use of the fact that several parts of the system are dependent on the same resources. To that end, the cut-set generator stores previously calculated cut-sets for "reuse", identifies important component resources and pre-computes their cut-sets to maximize the benefits of cut-set reuse, as well as identifies and pre-computes cut-sets for repetitive patterns in the array of conditions (e.g., clustering).

In accordance with one aspect of the present disclosure there is provided a method of generating minimal cut-sets for highly integrated large systems. The method comprises the following steps:

Receiving a system model and a possible failure or degradation scenario.

Obtaining a dependency array from the system model according to the scenario, the dependency array comprising at least one possible failure or degradation case.

Selecting a possible failure or degradation case in the dependency array.

Querying a cut-set repository to determine if a cut-set for a component in the possible failure or degradation case is already stored, and retrieving said cut-set.

If a cut-set is not stored, generating the minimal cut-set for the particular component.

Computing a final cut-set list by expanding the dependency array using the cut-set for the particular component.

The method may further comprise storing the cut-set for later retrieval, if the queried cut-set is not stored in the cut-set repository.

In a preferred embodiment the method comprises receiving dependency arrays of components or functions of the system model. In another embodiment the method comprises determining dependency arrays derived from the system model.

The method may comprise selecting each possible failure or degradation case in the dependency array and, for each possible failure or degradation case, querying the cut-set repository to retrieve a cut-set for each component included in the possible failure or degradation case.

The method preferably also comprises querying the cut-set repository to determine if a cut-set for a re-occurring cluster of components is already stored. The method may comprise a pre-computation step to determine re-occurring clusters of components.

According to a preferred embodiment, the method comprises a pre-computation step to determine the cut-sets for components to be stored in the cut-set repository based on the number of occurrences of the components across multiple dependency arrays of the system model; and storing said cut-sets in the cut-set repository for later reuse.

In accordance with a further aspect of the present disclosure there is provided a system for generating minimal cut-sets for highly integrated large systems. The system comprises a cut-set generator module comprising a processor configured for executing the steps of the method.

The system may further comprise the cut-set repository. In a preferred embodiment the system comprises a dependency arrays determination module configured for determining dependency arrays derived from the system model.

The features, functions, and advantages that have been discussed can be achieved independently in various embodiments or may be combined in yet other embodiments further details of which can be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
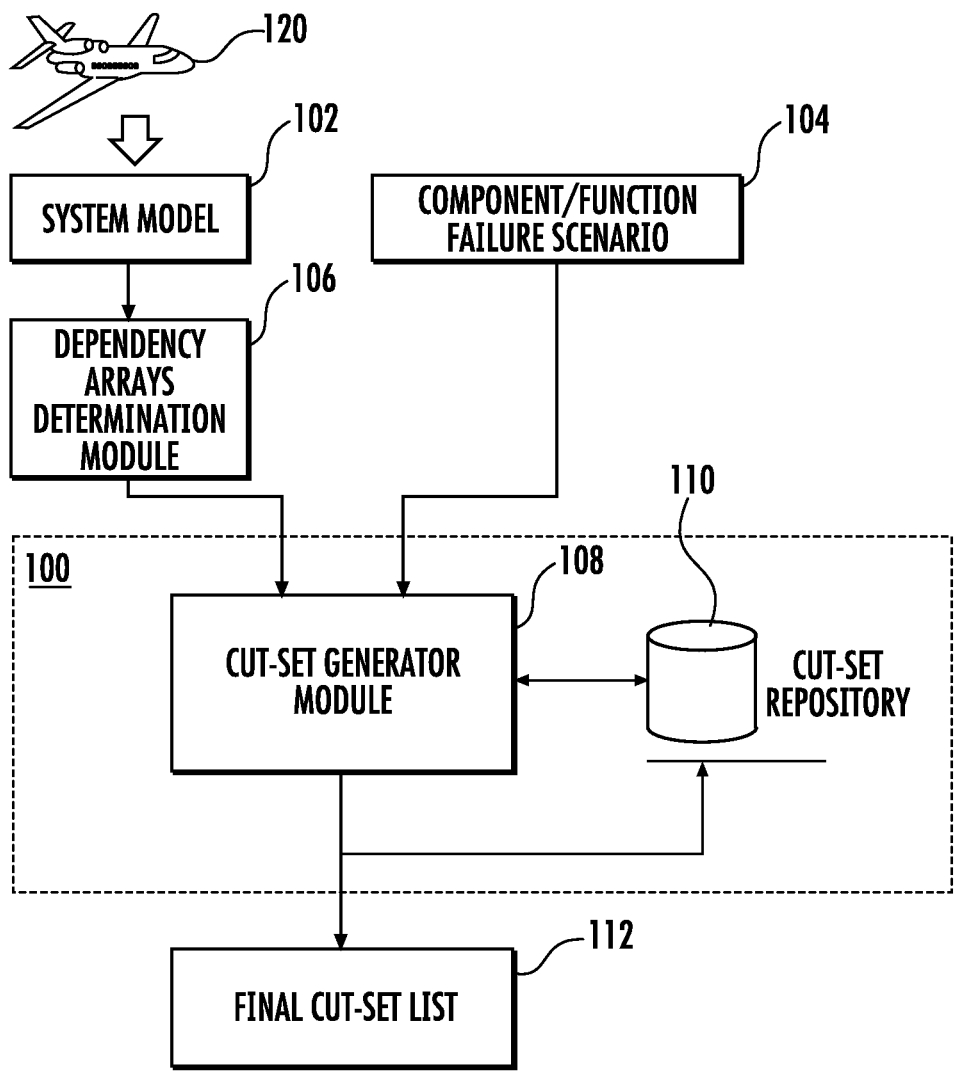
FIG. 1 depicts a high-level flow diagram of a cut-set generation process according to the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

FIG. 1 represents a high-level flow diagram of a cut-set generation system 100. The cut-set generation system 100 takes as input:

A system model 102 of a highly integrated large system 120 (an airplane, for instance) where the failure analysis is to be performed, and optionally a set of dependency arrays of said system model 102.

A possible failure or degradation scenario 104 which will be considered for reliability assessment of the highly integrated large system 120.

The system comprises a cut-set repository 110 and a cut-set generator module 108 which processes the inputs to obtain a final cut-set list 112. The dependency arrays of the system model 102 are determined by a dependency arrays determination module 106, which in the embodiment shown in FIG. 1 is a component external to the system 100. Alternatively, the cut-set generation system 100 may also comprise a dependency arrays determination module 106, necessary when the dependency arrays are not externally provided.

Figure 2:
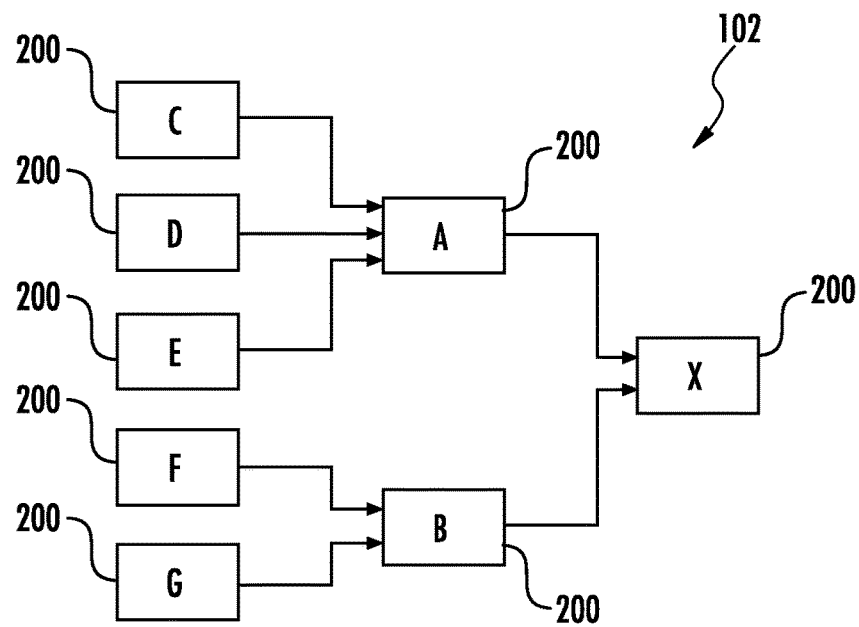
FIG. 2 shows an example of a basic system model.

The system model 102 is defined as a dependency model. FIG. 2 shows an example of a very basic system model 102 comprising a plurality of components or functions 200. The system model 102 can be defined at a component level (e.g., possible failure of components A and B together could generate a failure of component X) or at a functional level or a functional degradation. As used herein, the word failure or the phrases component degradation or functional degradation can generally include any undesirable or unexpected change in performance. For example, it is understood that in nearly any mechanical system the components could wear and reliability of the system could be affected if the worn parts were not replaced prior to exceeding accepted tolerances. The system model 102 defines a relationship between components or functions 200, which are structured at different hierarchy levels. In the example of FIG. 2, components C, D, E, F and G are located at a first hierarchy level, components A and B at a second hierarchy level, and component X at a third hierarchy level. This way, the functioning of component A depends on components C, D and E and the functioning of component B depends on components F and G. Similarly, the reliable functioning of component X may depend on components A and B. Although the cut-set generation system 100 is especially aimed to work with highly integrated large systems 120 comprising a large number of components 200, it can work with systems comprising any number of components 200.

Figure 3:
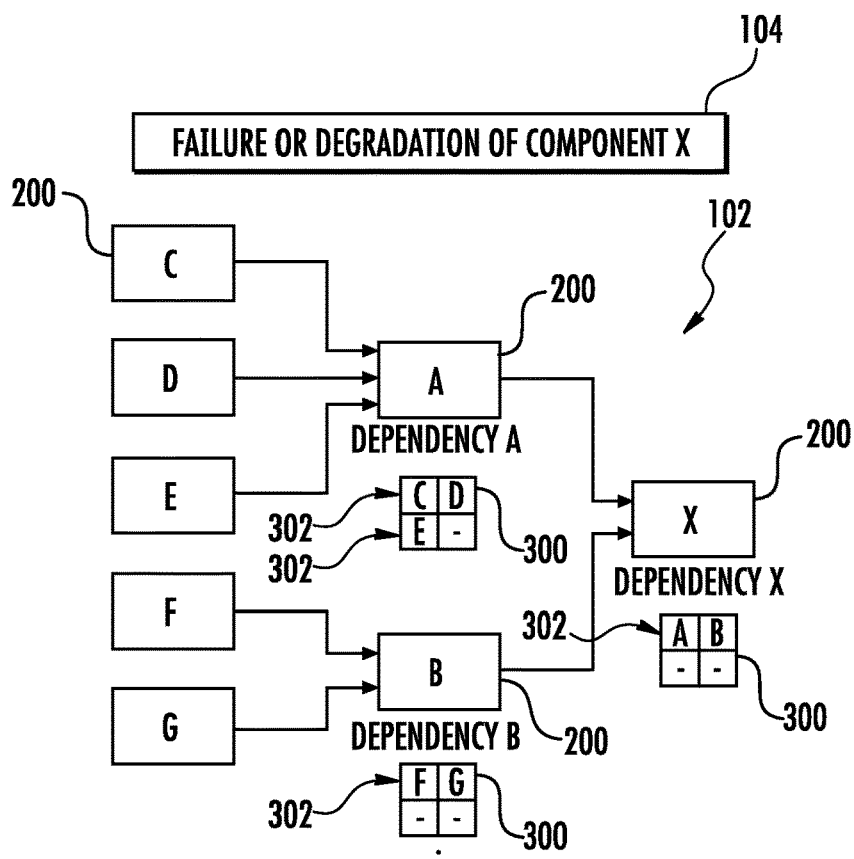
FIG. 3 represents an example of dependency arrays of the system model of FIG. 2.

In reference again to FIG. 1, the cut-set generator module 108 receives the dependency arrays of the system model 102, which are determined by the dependency arrays determination module 106. As an example, dependency arrays 300 for the components or functions 200 of the system model 102 of FIG. 2 are depicted in FIG. 3. A dependency array 300 comprises one or more failure or degradation cases 302, each case 302 comprising in turn one or more component or function labels. If any of the cases 302 occurs, it will cause the failure or degradation of the specified component or function 200. For instance, in the example shown in FIG. 3 component A could fail or degrade if:

Both components C and D fail or degrade; or

Component E fails or degrades.

It is important to point out that the dependency array 300 of a component or function 200 only includes components which are immediately upstream (e.g., in the immediate higher level) of the component or function in the functional dependency path. In this manner, the functional dependency path can be followed with the different arrows connecting the components or functions 200 located in different hierarchy levels). Further, dependency array 300 of component X only includes reference to components A and B, which are in the immediate superior level. In turn, dependency array of component A includes reference to components C, D and E which are in the immediate higher level.

Figure 4:
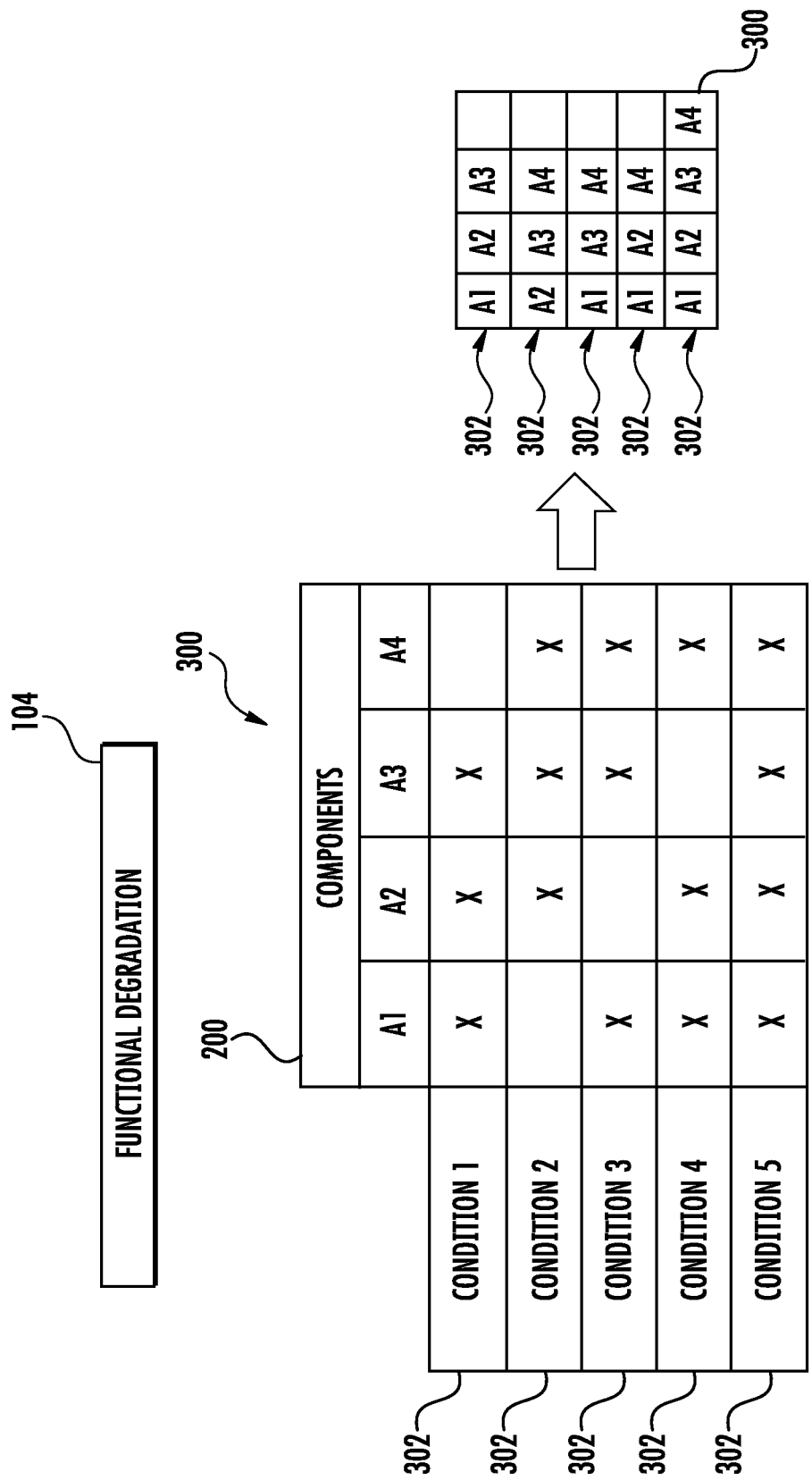
FIG. 4 illustrates an example of a set of possible failure conditions of a possible failure scenario defined by a high-level function, for reliability assessment of a highly integrated large system.

A failure or degradation scenario 104 may be defined as a component failure or degradation, a function failure or degradation or a combination of component or functional failure or degradation. For instance, in FIG. 3 the scenario 104 is defined as the failure of component X, the component X with a dependency array 300 having a single failure or degradation case 302 (A,B). The scenario 104 may instead be defined as a functional degradation of a high-level function, such as loss of reliable control of a portion of an airplane control structure, as shown in FIG. 4. In the example depicted in FIG. 4 the loss of reliable control of an airplane control structure could be the simultaneous failure or degradation of at least three ailerons, each aileron being a different component 200 of the system 120 (e.g., the airplane). Since the airplane considered in the example has four different ailerons (A1, A2, A3, A4), the dependency array 300 of the scenario 104 defined by this function may be constructed as five different conditions or cases 302:

Condition 1: failure or degradation of ailerons A1, A2 and A3.

Condition 2: failure or degradation of ailerons A2, A3 and A4.

Condition 3: failure or degradation of ailerons A1, A3 and A4.

Condition 4: failure or degradation of ailerons A1, A2 and A4.

Condition 5: failure or degradation of ailerons A1, A2, A3 and A4.

The failure or degradation scenario occurs if any failure or degradation case 302 is met. Thus, the cut-set generation system 100 could calculate cut-sets for each case 302 independently, adding the resulting cut-set list together to form the complete list for the function failure.

The cut-set generator module 108 receives as input the system model 102, the dependency arrays 300 of the system model, and the failure or degradation scenario 104. The cut-set generator module 108 implements a cut-set generation algorithm according to the steps shown in FIG. 5. The cut-set generation algorithm takes the dependency arrays 300 for the involved model components or functions starting with the specified failure or degradation scenario 104 and working upstream from there. For a given component or function, its dependency array 300 is distinct from its cut-set list if the component has upstream dependencies due to the fact that the dependency array 300 only includes components 200 which are immediately upstream of the component or function 200 in the functional dependency path. The component dependencies are derived by the dependency arrays determination module 106 from the system model 102 by analyzing component failure logic and system architecture information. This process is preferably performed outside the cut-set generation system 100, as depicted in FIG. 1.

Figure 5:
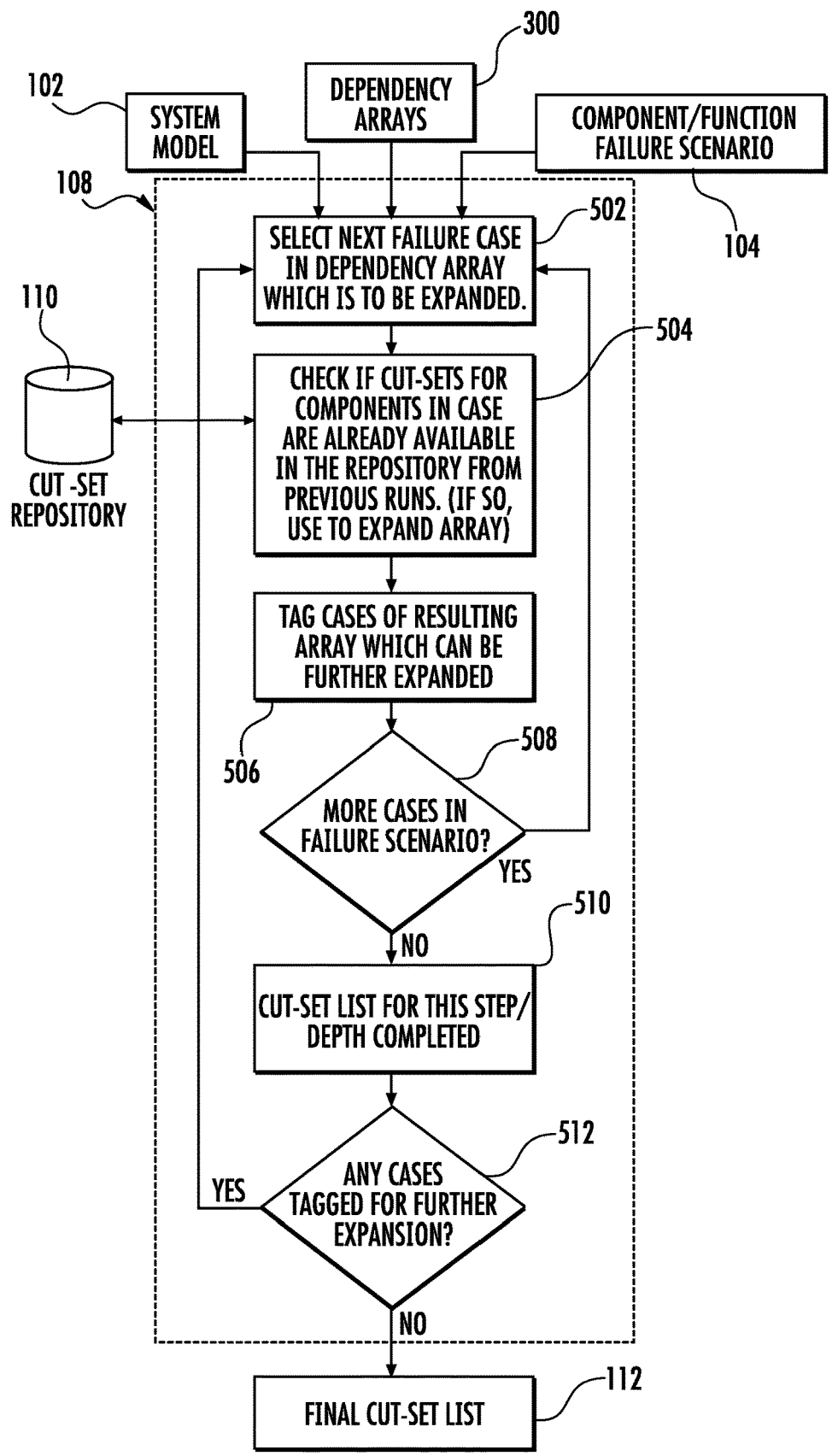
FIG. 5 shows the cut-set generation algorithm detailing the process of expanding dependency arrays on the possible failure path.
Figure 6:
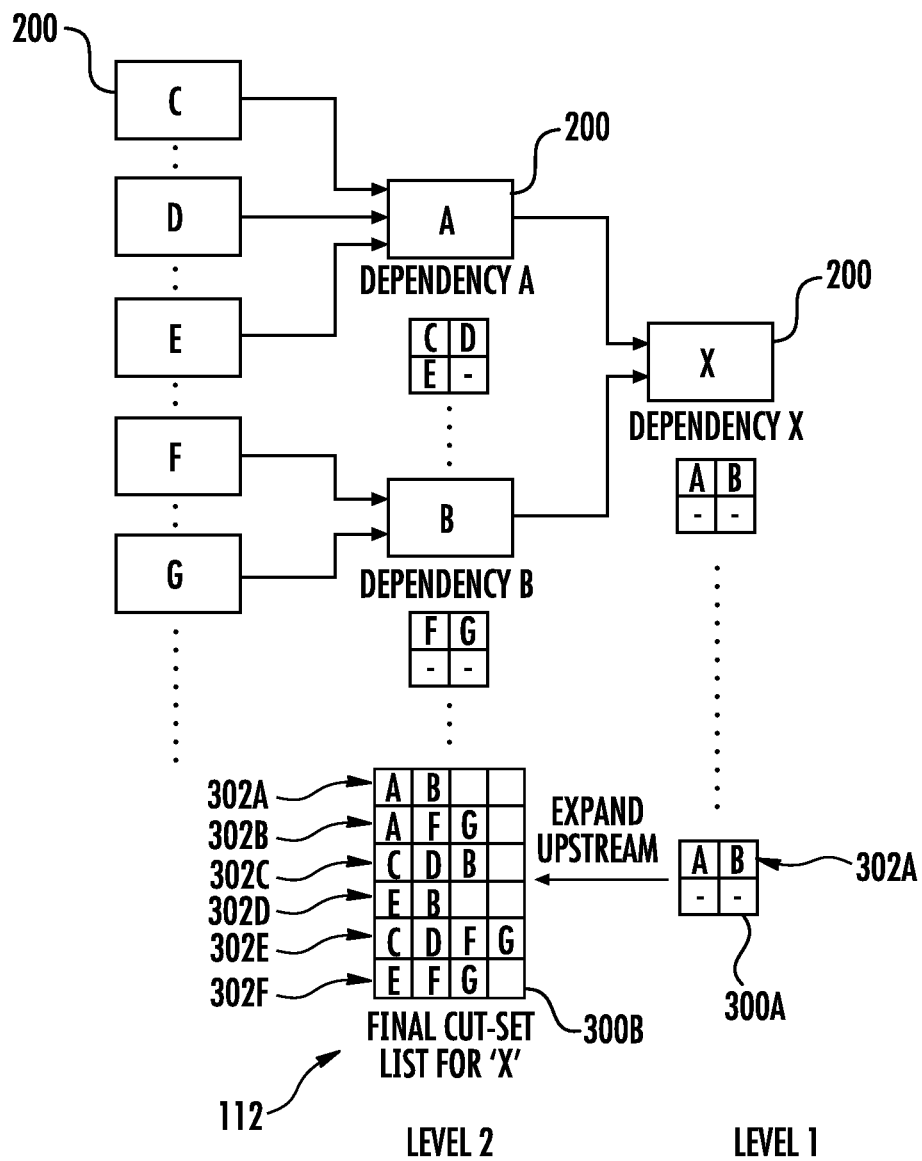
FIG. 6 shows, for the dependency arrays example of FIG. 3, the upstream expansion of dependency arrays and the resulting cut-set list for component X.

FIG. 5 shows in more detail the process of expanding the dependency arrays on the dependency path for obtaining the final cut-set list 112. The arrays are expanded in an iterative approach from the top level component or function of interest, back upstream through the system model 102, until all paths have been completed, as illustrated in the example of FIG. 6. This FIG. 6 shows, for the dependency arrays 300 of FIG. 3, the upstream expansion of the dependency arrays and the resulting cut-set list for failure or degradation of component X. The dependence arrays 300 are expanding by combining the local dependency arrays for each component 200 upstream in the dependency path from the component of interest (e.g., component X in the example).

One of the core operations in this expansion process, which is repeated many times, is an array combining operation. A combining operation for a specific component combines the dependency array 300 of that component with the immediate upstream component(s) and their respective dependency arrays 300. Sequences of these operations are used to build up the final cut-set list 112 for a given failure or degradation scenario 104 of interest, by expanding the dependency arrays 300 along the various failure paths. These combining operations demand large computational resources.

The steps involved in the iterative process of expanding dependency arrays on the dependency path, performed by the cut-set generator module 108 and shown in FIG. 5, are the following:

Select 502 next failure or degradation case 302 in the dependency array 300 which is to be expanded.

Check 504 if cut-sets for components or functions 200 in the case 302 are already available in the cut-set repository 110 storing saved cut-sets from previously run cases. If so, use to expand dependency array 400. If not, directly expand upstream the dependency array 300. The cut-set generator module 108 stores cut-sets generated for every component or function 200 in the cut-set repository 110 or, alternatively, searches the failure or degradation scenario 104 for clusters or resources and pre-compute those intermediate cluster cut-sets, which will be stored in the cut-set repository 110 and used multiple times, as it will be later explained in detail in FIGS. 7B, 8 and 9.

Tag 506 cases 302 of resulting dependency array which can be further expanded.

Check 508 if there are more cases 302 in the dependency array 300. If there are more pending failure cases in the current dependency array 300, go back to step 502 to select next case 302 and repeat previous steps until there are no more cases 302 to process.

When there are no more cases 302 to process, the cut-set list for this depth or level is considered completed 510.

Then, it is checked 512 whether there are any cases tagged (in step 506) for further expansion. If there are more cases, the process continues in step 502 with the next case 302 until there are no more tagged cases left. The final cut-list 112 is then finally obtained.

In the example of FIG. 6, the final cut-set list 112 for component X is determined. The iterative process of expanding dependency arrays on the failure path work as follows:

According to step 502, the process starts with the next failure or degradation case, in this case with the first case 302A of the dependency array 300A of component X, which is formed by only one case. Component X is located in level 1. The failure or degradation case is (A, B), which means that to get a failure or degradation of component X it is necessary to have failures or degradation of both components A and B.

In step 504 it is checked if cut-sets for components A or B are stored in the repository 110 (from previously run cases). Supposing that the cut-sets for A or B are not stored in the repository 110, the dependency array is expanded upstream using the dependency arrays of components A and B. The upstream expansion results in the expanded dependency array 300B, with:

The first case 302A (A,B).

A second case 302B (A,F,G), with the combination of component A and the first row of dependency array of component B.

A third case 302C (C,D,B), with the combination of component B and the first row of dependency array of component A.

A fourth case 302D (E,B), with the combination of component B and the second row of dependency array of component A.

A fifth case 302E (C,D,F,G) with the combination of the first row of dependency array of component A and the first row of dependency array of component B.

A sixth case 302F (E,F,G) with the combination of the second row of dependency array of component A and the first row of dependency array of component B.

In step 506 failure or degradation cases of resulting dependency array which can be further expanded are tagged. In this case, none of the cases can be further expanded, so they are not tagged.

In step 508 it is checked if there are more cases in the dependency array 300A. Since dependency array 300A has no more cases, the process continues with step 510, where the cut-set list for this level (level 1) is considered completed.

In step 512 it is checked whether there are any cases tagged. Since there are no more cases tagged, the final cut-list 112 is finally obtained (it corresponds to expanded dependency array 300B).

In step 504 the cut-set generator module 108 checks whether there are previously calculated cut-sets stored for an upstream component when calculating cut-sets for a failure or degradation condition. To that end, the cut-set generator module 108 stores previously calculated cut-sets for systems components for reuse. Therefore, whenever the cut-set generator module 108 adds a new component to the fault path, a check is performed to determine if the cut-sets have already been computed for the new component. This check involves searching a storage variable where all results from previous runs have been stored for the model. If cut-set results exist from a previous run, the cut-set generator module 108 takes those results and use them in the expansion of the fault path.

Figure 7A:
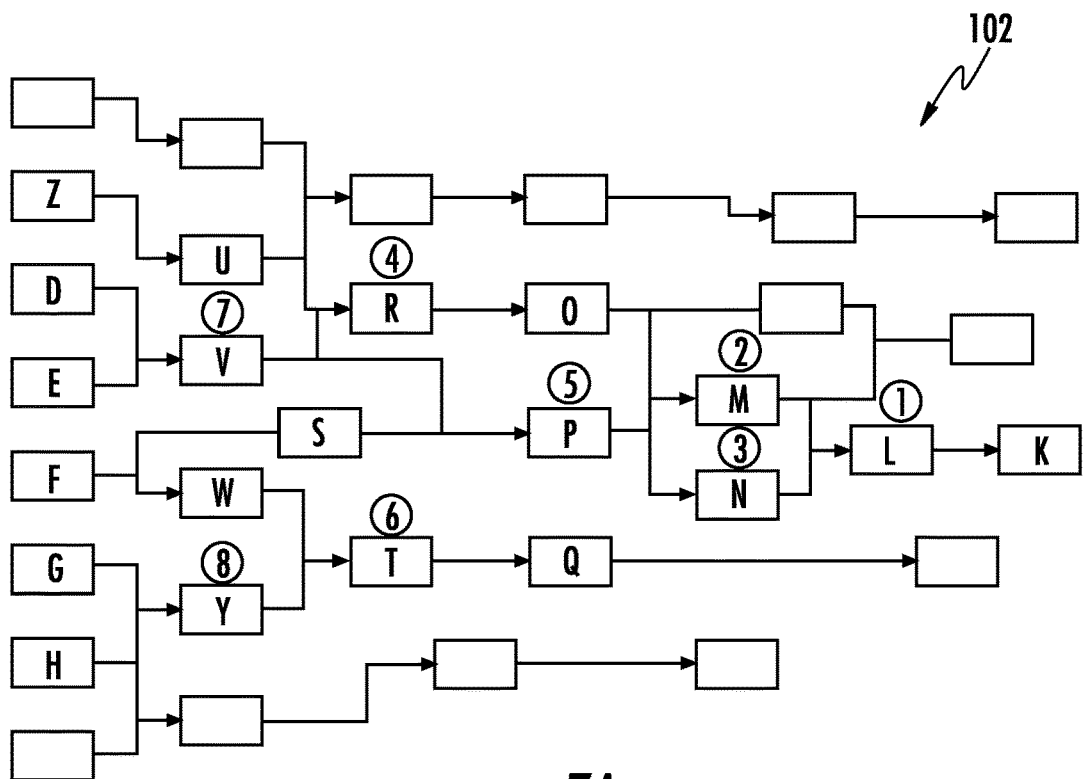
FIG. 7A shows the number of combining iterations for obtaining the cut-sets for a possible failure scenario of component K.
Figure 7B:
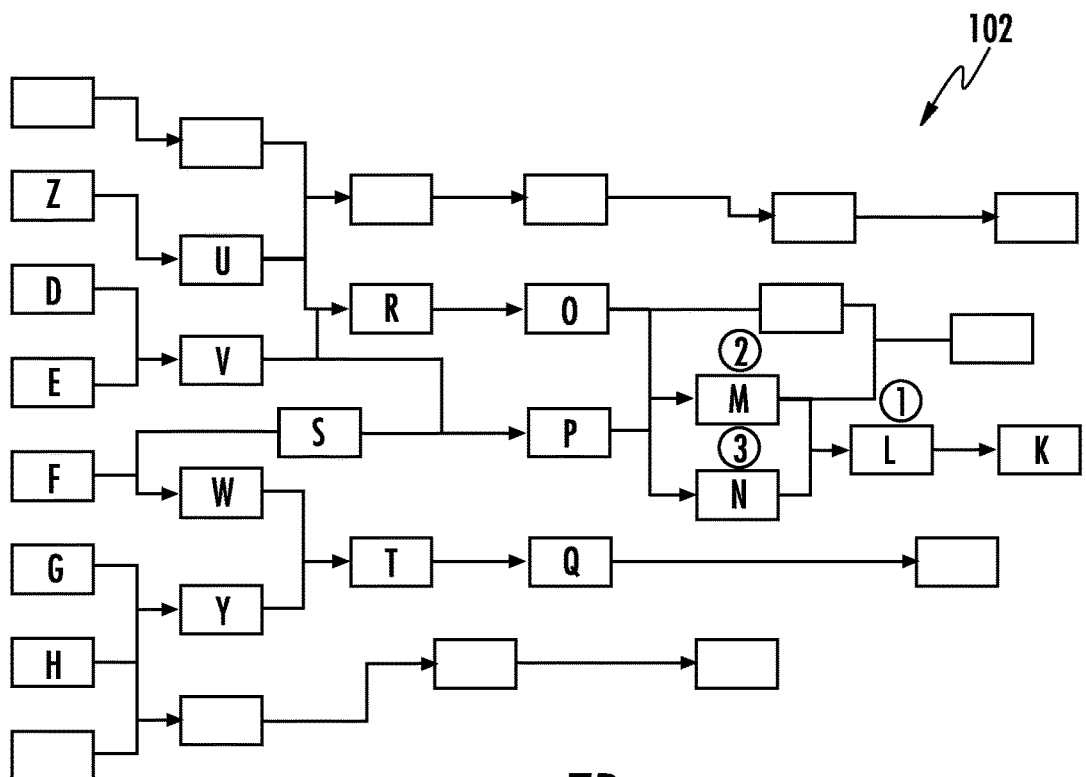
FIG. 7B shows the reduced number of combining iterations when re-using previously calculated cut-sets.

FIGS. 7A and 7B show an illustrative example of how the method of re-using cut-sets from previous runs reduces the number of combining operations required to obtain the cut-sets for the component K in an example of system model 102. FIG. 7A shows all the combining iterations required for the entire process (8 combining operations). FIG. 7B shows how re-use of storage information from previous runs reduces the number of iterations required to achieve the same result (3 combining operations). In this example, cut-sets for components O, P and Q had been evaluated from previous runs.

To determine which cut-sets are to be stored in the repository, the cut-set generator module 108 can previously identify system components which are serving as resources for a large number of components within the system model 102. This enables maximum efficiency improvement by pre-computation and reuse of the cut-sets for these components.

Figure 8:
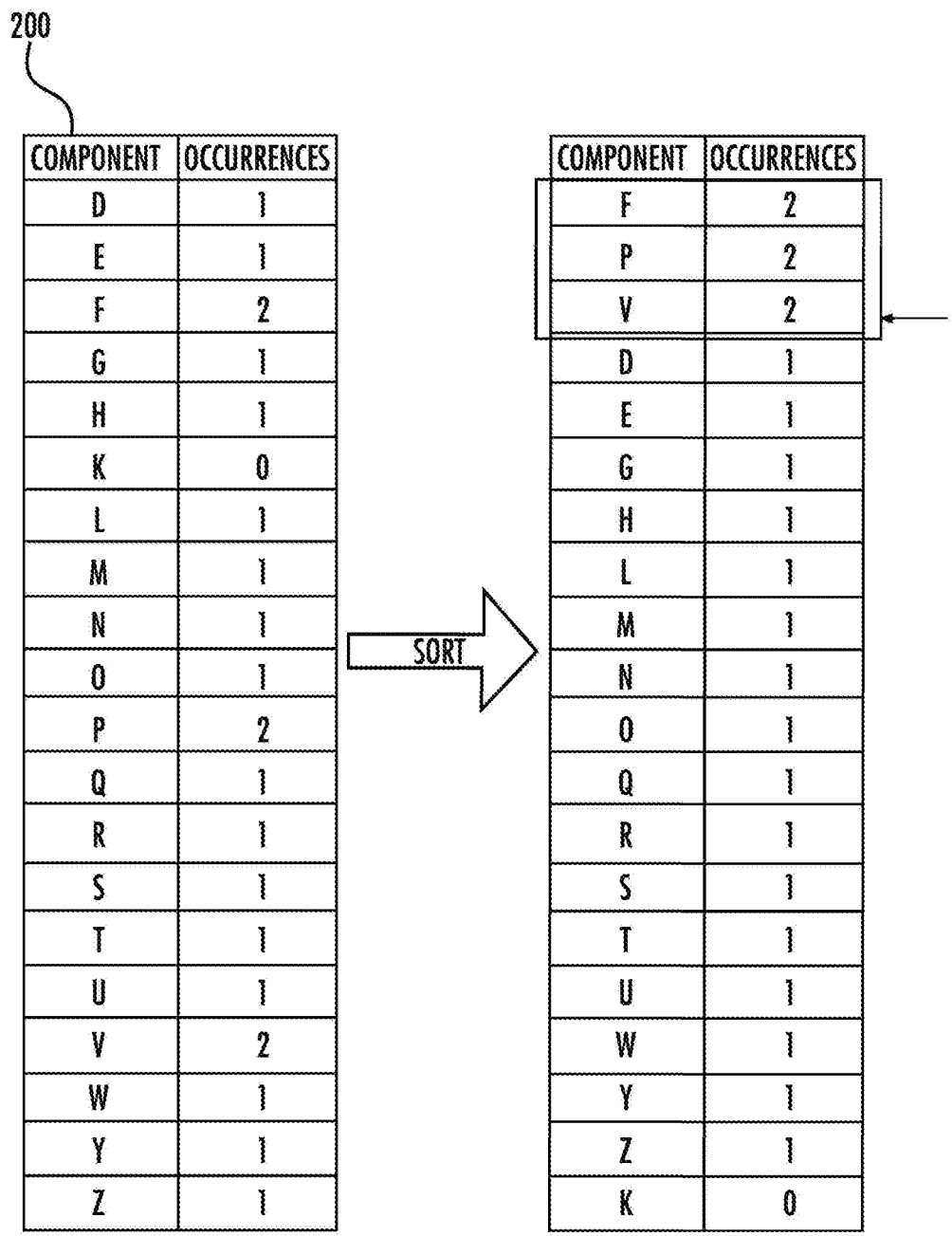
FIG. 8 represents the identification of resource components for the example system shown in FIG. 7A.

The essential resources in the system are identified by counting the number of occurrences of every component in the system model 102 within the direct upstream dependency for each component in the system. A fixed upper percentile (e.g., the $25^{th}$ percentile) may be selected for pre-computation and storage of the cut-sets for reuse. FIG. 8 represents the identification of resource components for the example system shown in FIG. 7A, to obtain a component list with the count of occurrences in the dependency arrays. In one example, in how many dependency arrays 300 the component is found, occurrences of the component across multiple dependency arrays. Subsequent sorting and application of a selection condition (e.g., upper $25^{th}$ percentile) shortlists the set of components to compute the cut-sets for (in the case shown in FIG. 8, components F, P and V have 2 occurrences each). For the chosen example no cut-sets need to be computed for component Z as the component has no upstream dependencies.

Figure 9:
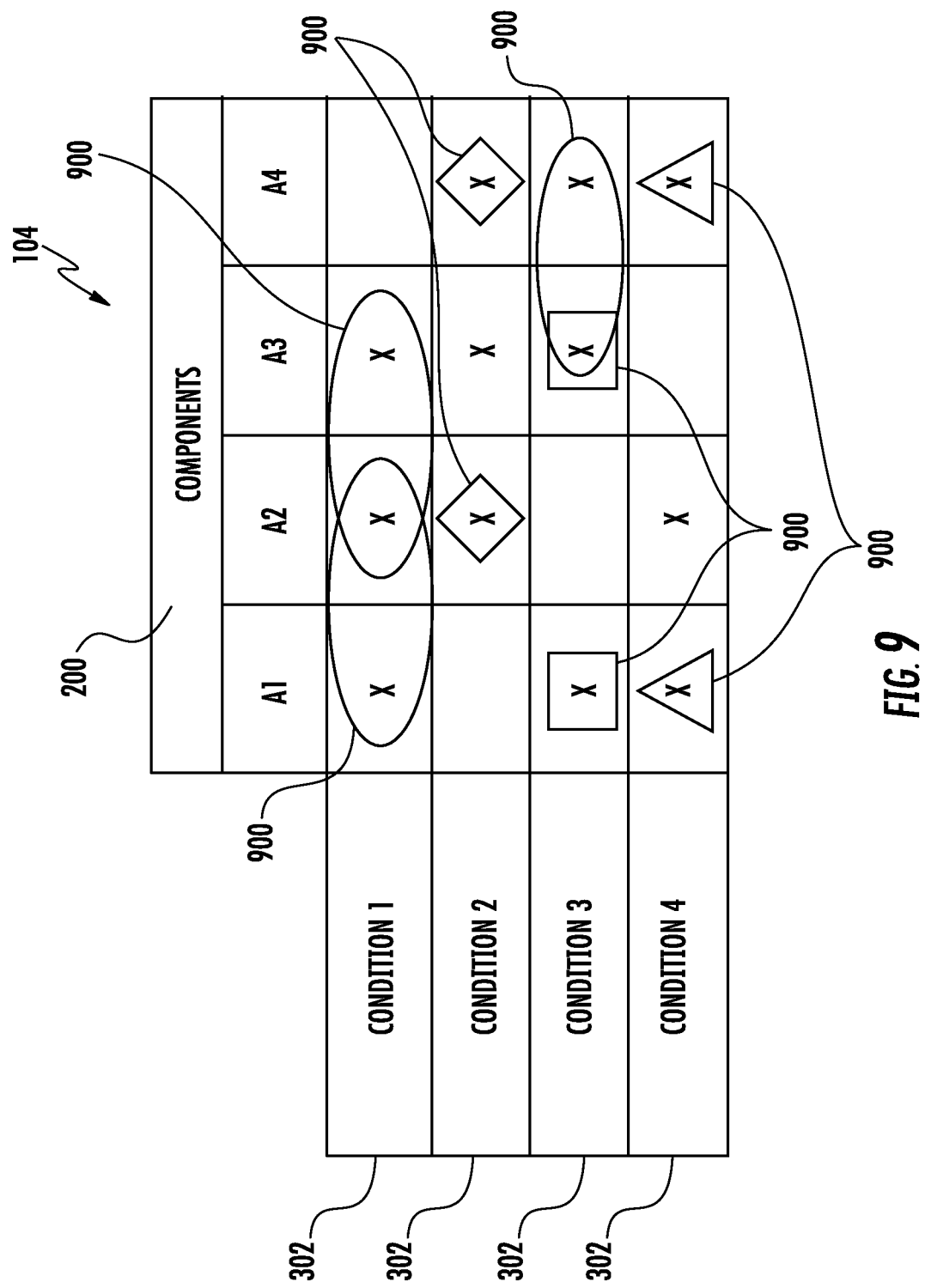
FIG. 9 depicts the identification of re-occurring clusters of components in the array of failure conditions of FIG. 3.

As well as components may appear in multiple dependency arrays, sets of components (clusters) may also occur in many dependency arrays, especially in failure or degradation scenarios defined by high-level functions, for instance, the scenario 104 of FIG. 4. A standard approach would calculate cut-sets for each condition 300 independently, adding the resulting cut-set lists together to form the complete list for the functional degradation. However, by identifying clusters of components 900 re-occurring in the set or array of failure or degradation cases 302 prior to calculating cut-sets, the computational effort is greatly reduced. FIG. 9 shows the identification of those re-occurring clusters 900 for the example of FIG. 4:

Cluster A1 & A2: 2 occurrences.
Cluster A1 & A3: 2 occurrences.
Cluster A2 & A3: 2 occurrences.
Cluster A2 & A4: 2 occurrences.
Cluster A3 & A4: 2 occurrences.
Cluster A1 & A4: 2 occurrences.

Due to the nature of the dependency array 104 of the example, every pair of components from a condition row (e.g., failure or degradation case 302) is a cluster, as it will be repeated in another row. Although all of the clusters identified here cannot be used, the one that can will greatly increase the efficiency of the cut-set generation process. To that end, a search is performed for matching sets of components (cluster) within one single dependency array. In FIG. 9 a search is previously performed for finding matching sets of components (cluster) within one single dependency array.

For the identified clusters 900, the cut-sets can now be pre-computed and reused for several rows in the array of failure or degradation cases 302. The efficiency improvement increases for clusters involving a larger number of system components as well as larger numbers of occurrences of the clusters 900 in the array of failure or degradation cases 302. Whether the efficiency improvements of identifying clusters 900 across a larger number of components (across the array) are outweighing the benefits of covering more failure or degradation conditions (down the array) will depend on the actual system and cut-set calculation algorithm.

For the example shown in FIG. 9 it can be seen that six clusters 900 can be identified, each cluster 900 contained in two different rows; however, in this example only two clusters can be made use of to increase efficiency due to intersections of the clusters. Hence, when passing from one case (e.g., condition 1) to the next (e.g., condition 2) which contains a matching cluster (e.g., A2 & A3), instead of performing two cut-set combining operations of which one is for components previously computed, the combining effort is reduced to one cut-set combining operations between a pre-computed cluster (A2 & A3) and a single component (A1). In this example at least six combining operations will be necessary (eight would be required without using clusters).

The advantage of using clusters increases with larger dependency arrays. The dependency array 104 in FIG. 9 is an example of a simpler function definition of 3 out of 4 components. The reduction in combining operations for the levels of redundancy typical for highly critical aircraft functions (including combinations like 14 out of 18 components) are substantial.

Figure 10:
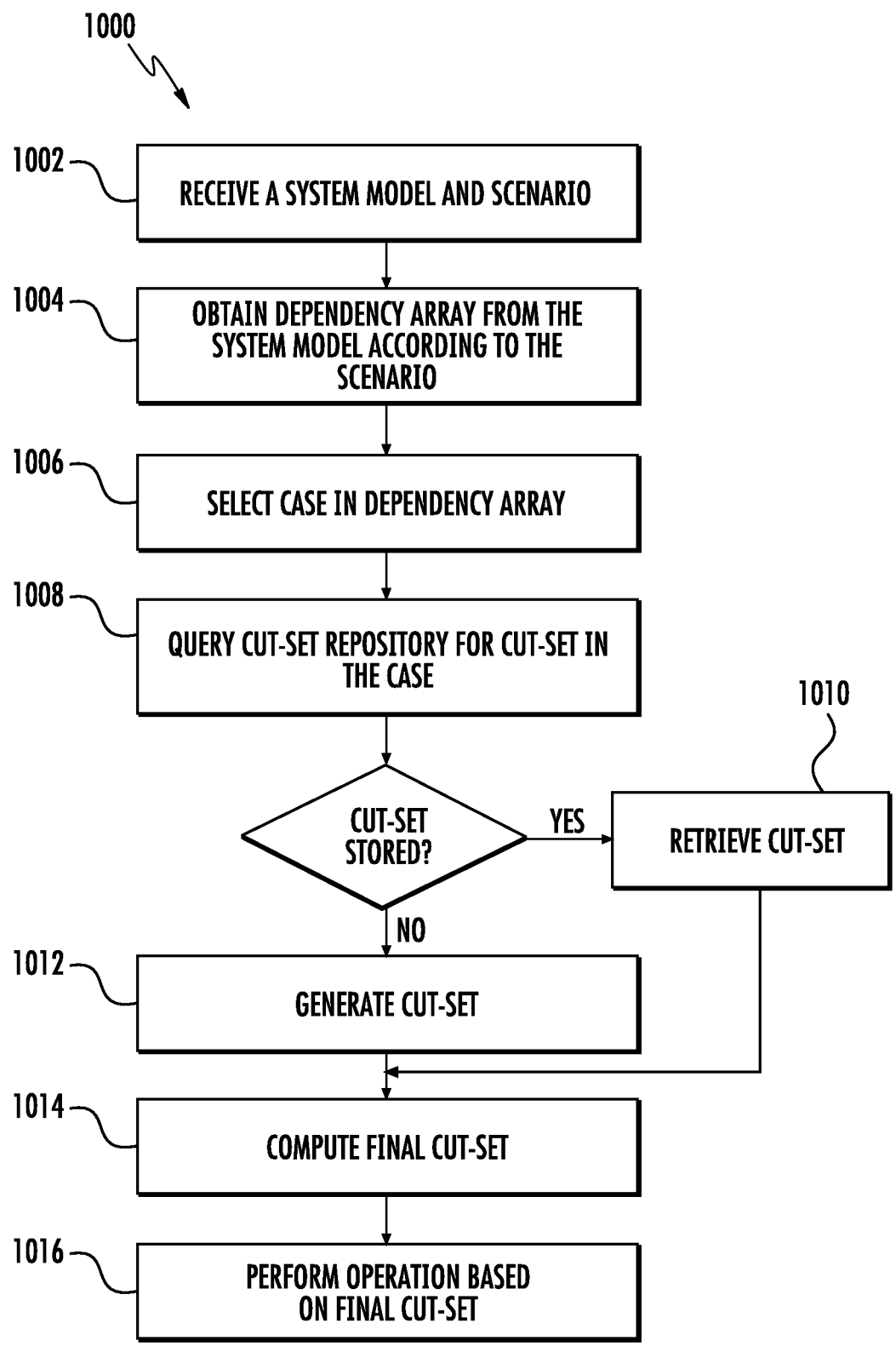
FIG. 10 is a flowchart illustrating various steps in a method of generating minimal cut-sets for highly integrated large systems, according to example implementations.

FIG. 10 is a flowchart illustrating various steps in a method 1000 of generating minimal cut-sets for highly integrated large systems, according to example implementations of the present disclosure. As shown at blocks 1002 and 1004, the method includes receiving a system model 102 and a scenario 104, and obtaining a dependency array 300 from the system model 102 according to the scenario, with the dependency array 300 comprising at least one case 302. The method includes selecting a case 302 in the dependency array 300, as shown at block 1006. The method includes querying a cut-set repository 110 to determine if a cut-set for a component 200 in the case 302 is already stored, and retrieving said cut-set; and if a cut-set is not stored, generating the minimal cut-set for the particular component 200, as shown at blocks 1008, 1010 and 1012. The method includes computing a final cut-set list 112 by expanding the dependency array 300 using the cut-set for the particular component 200, as shown at block 1014. And the method includes performing a pre-production, production or post-production operation with respect to the manufactured system based on the final cut-set list, as shown in block 1016.

Figure 11:
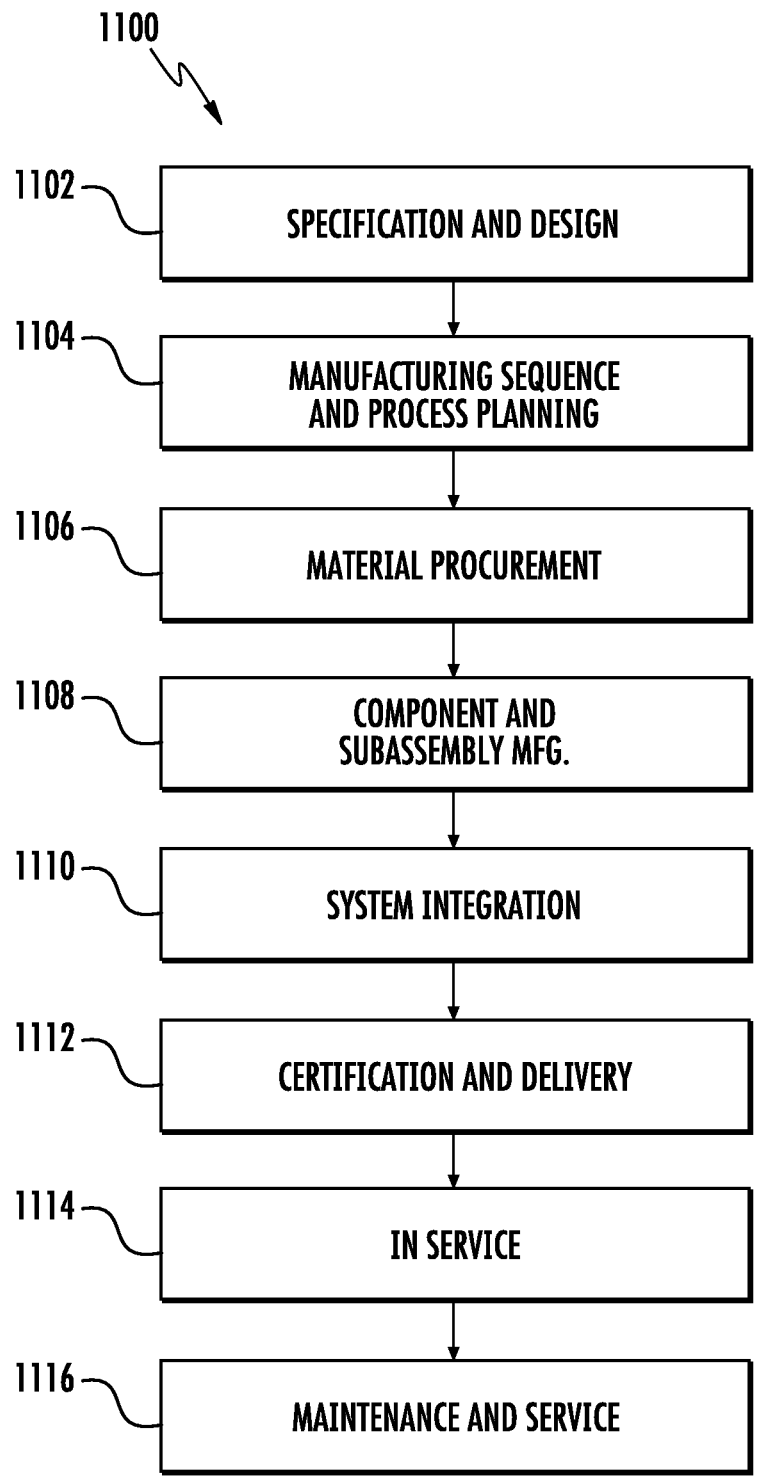
FIG. 11 is a flow diagram of an example aircraft production and service methodology.

Referring now to FIG. 11, example implementations may be used in the context of an aircraft manufacturing and service method 1100. During pre-production, the example method may include specification and design 1102 of the aircraft and its supporting electronic systems, manufacturing sequence and processing planning 1104 and material procurement 1106. During production, component and subassembly manufacturing 1108 and system integration 1110 of the aircraft takes place. The disclosed system 100 and method 1000 may be specified for use, for example, during specification and design 1102.

In various examples, the disclosed system 100 and method 1000 may be used during any one or more of the aforementioned pre-production or production stages, or during post-production. During post-production, the aircraft may go through certification and delivery 1112 in order to be placed in service 1114. While in service by a customer, the aircraft may be scheduled for routine maintenance and service 1116 (which may also include modification, reconfiguration, refurbishment or the like). The system 100 and method 1000 of example implementations may be used during certification and delivery 1112, or while the aircraft is in service, and in one example, during maintenance and service 1116 of the aircraft.

Each of the processes of the example method 1100 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like. Although an aerospace example is shown, the principles of the disclosure may be applied to any of a number of manufactured systems, such as those in the automotive, marine and computer network industries. That is, for example, the principles of the disclosure may be applied to manufactured systems such as aerospace, automotive, marine or computer network systems.

According to example implementations of the present disclosure, the cut-set generation system 100 and its subsystems including the dependency arrays determination module 106, a cut-set generator module 108 and cut-set repository 120 may be implemented by various means. Means for implementing the system 100 and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 12:
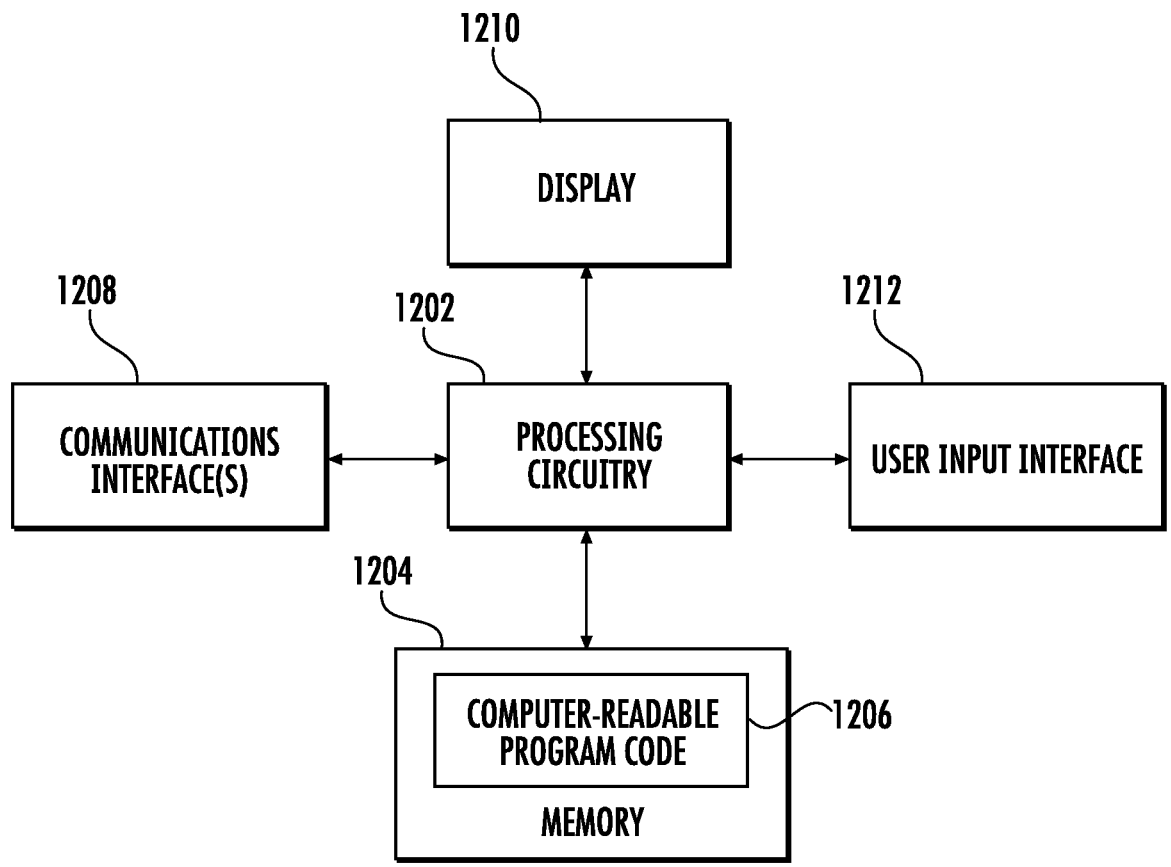
FIG. 12 illustrates an apparatus according to some example implementations.

FIG. 12 illustrates an apparatus 1200 according to some example implementations of the present disclosure. Generally, the apparatus 1200 of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus 1200 may include one or more of each of a number of components such as, for example, processing circuitry 1202 (e.g., processor unit) connected to a memory 1204 (e.g., storage device).

The processing circuitry 1202 may be composed of one or more processors alone or in combination with one or more memories. The processing circuitry 1202 is generally any piece of computer hardware that is capable of processing information such as, for example, data, computer programs and/or other suitable electronic information. The processing circuitry 1202 is composed of a collection of electronic circuits some of which may be packaged as an integrated circuit or multiple interconnected integrated circuits (an integrated circuit at times more commonly referred to as a "chip"). The processing circuitry 1202 may be configured to execute computer programs, which may be stored onboard the processing circuitry 1202 or otherwise stored in the memory 1204 (of the same or another apparatus).

The processing circuitry 1202 may be a number of processors, a multi-core processor or some other type of processor, depending on the particular implementation. Further, the processing circuitry 1202 may be implemented using a number of heterogeneous processor systems in which a main processor is present with one or more secondary processors on a single chip. As another illustrative example, the processing circuitry 1202 may be a symmetric multi-processor system containing multiple processors of the same type. In yet another example, the processing circuitry 1202 may be embodied as or otherwise include one or more ASICs, FPGAs or the like. Thus, although the processing circuitry 1202 may be capable of executing a computer program to perform one or more functions, the processing circuitry 1202 of various examples may be capable of performing one or more functions without the aid of a computer program. In either instance, the processing circuitry 1202 may be appropriately programmed to perform functions or operations according to example implementations of the present disclosure.

The memory 1204 is generally any piece of computer hardware that is capable of storing information such as, for example, data, computer programs (e.g., computer-readable program code 1206) and/or other suitable information either on a temporary basis and/or a permanent basis. The memory 1204 may include volatile and/or non-volatile memory, and may be fixed or removable. Examples of suitable memory 1204 include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory 1204 may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1204, the processing circuitry 1202 may also be connected to one or more interfaces for displaying, transmitting and/or receiving information. The interfaces may include a communications interface 1208 (e.g., communications unit) and/or one or more user interfaces. The communications interface 1208 may be configured to transmit and/or receive information, such as to and/or from other apparatuses(es), network(s) or the like. The communications interface 1208 may be configured to transmit and/or receive information by physical (wired) and/or wireless communications links. Examples of suitable communication interfaces include a network interface controller (NIC), wireless NIC (WNIC) or the like.

The user interfaces may include a display 1210 and/or one or more user input interfaces 1212 (e.g., input/output unit). The display 1210 may be configured to present or otherwise display information to a user, suitable examples of which include a liquid crystal display (LCD), light-emitting diode display (LED), plasma display panel (PDP) or the like. The user input interfaces 1212 may be wired or wireless, and may be configured to receive information from a user into the apparatus 1200, such as for processing, storage and/or display. Suitable examples of user input interfaces 1212 include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1200 may include a processing circuitry 1202 and a computer-readable storage medium or memory 1204 coupled to the processing circuitry 1202, where the processing circuitry 1202 is configured to execute computer-readable program code 1206 stored in the memory 1204.

It will also be understood that one or more functions, and combinations of functions, may be implemented by special purpose hardware-based computer systems and/or processing circuitry 1202 which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method (1000) comprising:
receiving (1002) a system model (102) and a scenario (104), the system model being for a manufactured system composed of a plurality of components (200);
obtaining (1004) a dependency array (300) from the system model (102) according to the scenario, the dependency array (300) comprising at least one case (302);
selecting (1006) a case (302) in the dependency array (300);
executing a pre-computation step including:
identifying re-occurring clusters of components (900) in the dependency array (300) and utilizing the re-occurring clusters of components (900) in cut-set combining operations to determine cut-sets for components (200) in the re-occurring clusters of components (900), and storing said cut-sets in the cut-set repository (110) for later reuse, and
determining cut-sets for components (200) to be stored in the cut-set repository (110) based on a number of occurrences of the components (200) across multiple dependency arrays of the system model (102), and storing said cut-sets in the cut-set repository (110) for later reuse;
querying (1008) a cut-set repository (110) to determine if a cut-set for a component (200) of the plurality of components (200) in the case (302) is already stored, and retrieving (1010) said cut-set;
if a cut-set is not stored, generating (1012) the minimal cut-set for the component (200) or the re-occurring clusters of components (900);
computing (1014) a final cut-set list (112) by expanding the dependency array (300) using the cut-set for the component (200) or the re-occurring clusters of components (900); and
performing (1016) a pre-production, production, or post-production operation with respect to the manufactured system based on the final cut-set list.

2. The method (1000) of claim 1, further comprising, if the queried cut-set is not stored in the cut-set repository (110), storing said cut-set for later retrieval.

3. The method (1000) of claim 1, wherein obtaining (1004) the dependency array (300) from the system model (102) includes receiving a dependency array (300) of components (200) or functions of the system model (102).

4. The method (1000) of claim 1, wherein obtaining (1004) the dependency array (300) from the system model (102) includes determining a dependency array (300) derived from the system model (102) according to the scenario (104), the dependency array (300) comprising at least one case (302) such that the scenario (104) occurs if the at least one case (302) is met.

5. The method (1000) of claim 1, further comprising:
selecting each case (302) in the dependency array (300), and
for each case (302), querying the cut-set repository (110) to retrieve a cut-set for each component (200) included in the case (302).

6. The method (1000) of claim 1, wherein at least one of:
the scenario is one of a failure scenario or a degradation scenario, or
the case is one of a failure case or a degradation case.

7. An apparatus (1200) comprising processing circuitry (1202) and a memory (1204) storing computer-readable program code (1206) that, in response to execution by the processing circuitry (1202), cause the apparatus (1200) to at least:
receive a system model (102) and a scenario (104), the system model being for a manufactured system composed of a plurality of components (200);
obtain a dependency array (300) from the system model (102) according to the scenario, the dependency array (300) comprising at least one case (302);
select a case (302) in the dependency array (300);
execute a pre-computation step including:
identify re-occurring clusters of components (900) in the dependency array (300) and utilize the re-occurring clusters of components (900) in cut-set combining operations to determine cut-sets for components (200) in the re-occurring clusters of components (900), and store said cut-sets in the cut-set repository (110) for later reuse, and
determine cut-sets for components (200) to be stored in the cut-set repository (110) based on a number of occurrences of the components (200) across multiple dependency arrays of the system model (102), and store said cut-sets in the cut-set repository (110) for later reuse;
query a cut-set repository (110) to determine if a cut-set for a component (200) of the plurality of components (200) in the case (302) is already stored, and retrieve said cut-set;
if a cut-set is not stored, generate the minimal cut-set for the component (200) or the re-occurring clusters of components (900);
compute a final cut-set list (112) by expanding the dependency array (300) using the cut-set for the component (200) or the re-occurring clusters of components (900); and
perform a pre-production, production or post-production operation with respect to the manufactured system based on the final cut-set list.

8. The apparatus (1200) of claim 7, further comprising the cut-set repository (110).

9. The apparatus (1200) of claim 7, wherein when the apparatus (1200) is caused to obtain a dependency array (300) from the system model (102), the memory (1204) storing further computer-readable program code (1206) causes the apparatus (1200), in response to execution by the processing circuitry (1202), to further determine a dependency array (300) derived from the system model (102) according to the scenario (104), the dependency array (300) comprising at least one case (302) such that the scenario (104) occurs if the at least one case (302) is met.

10. The apparatus (1200) of claim 7, wherein the memory (1204) stores further computer-readable program code (1206) that, in response to execution by the processing circuitry (1202), cause the apparatus (1200) to further, if the queried cut-set is not stored in the cut-set repository (110), store said cut-set for later retrieval.

11. The apparatus (1200) of claim 7, wherein the apparatus being caused to select the case (302) and query the cut-set repository (110) includes being caused to respectively:
select each case (302) in the dependency array (300), and
for each case (302), query the cut-set repository (110) to retrieve a cut-set for each component (200) included in the case (302).

12. The apparatus (1200) of claim 7, wherein at least one of:

the scenario is one of a failure scenario or a degradation scenario, or the case is one of a failure case or a degradation case.

13. A computer-readable storage medium (1204) that is non-transitory and has computer-readable program code (1206) stored therein that in response to execution by a processor (1202), cause an apparatus (1200) to at least:

receive a system model (102) and a scenario (104), the system model being for a manufactured system composed of a plurality of components (200);

obtain a dependency array (300) from the system model (102) according to the scenario, the dependency array (300) comprising at least one case (302);

select a case (302) in the dependency array (300), execute a pre-computation step including:

identify re-occurring clusters of components (900) in the dependency array (300) and utilize the re-occurring clusters of components (900) in cut-set combining operations to determine cut-sets for components (200) in the re-occurring clusters of components (900), and store said cut-sets in the cut-set repository (110) for later reuse, and determine cut-sets for components (200) to be stored in the cut-set repository (110) based on a number of occurrences of the components (200) across multiple dependency arrays of the system model (102), and store said cut-sets in the cut-set repository (110) for later reuse;

query a cut-set repository (110) to determine if a cut-set for a component (200) of the plurality of components (200) in the case (302) is already stored, and retrieve said cut-set;

if a cut-set is not stored, generate the minimal cut-set for the component (200) or the re-occurring clusters of components (900);

compute a final cut-set list (112) by expanding the dependency array (300) using the cut-set for the component (200) or the re-occurring clusters of components (900); and perform a pre-production, production or post-production operation with respect to the manufactured system based on the final cut-set list.

14. The computer-readable storage medium (1204) of claim 13 having further computer-readable program code (1206) stored therein that in response to execution by the processor (1202), cause the apparatus (1200) to further, if the queried cut-set is not stored in the cut-set repository (110), store said cut-set for later retrieval.

15. The computer-readable storage medium (1204) of claim 13, wherein when the apparatus (1200) is caused to obtain a dependency array (300) from the system model (102), further computer-readable program code (1206) stored in the computer-readable medium (1204) causes the apparatus (1200), in response to execution by the processor (1202), to further receive a dependency array (300) of components (200) or functions of the system model (102).

\* \* \* \* \*